United States Patent
Juntti et al.

(10) Patent No.: US 9,112,695 B2
(45) Date of Patent: Aug. 18, 2015

(54) COOPERATIVE TRANSMISSION IN WIRELESS COMMUNICATION SYSTEM

(75) Inventors: Markku Juntti, Oulu (FI); Maria Kangas, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 730 days.

(21) Appl. No.: 13/120,183

(22) PCT Filed: Sep. 23, 2008

(86) PCT No.: PCT/EP2008/062678
§ 371 (c)(1),
(2), (4) Date: Mar. 22, 2011

(87) PCT Pub. No.: WO2010/034339
PCT Pub. Date: Apr. 1, 2010

(65) Prior Publication Data
US 2011/0170450 A1    Jul. 14, 2011

(51) Int. Cl.
H04L 1/18 (2006.01)
H04W 40/22 (2009.01)
H04L 1/20 (2006.01)
H04L 1/00 (2006.01)

(52) U.S. Cl.
CPC ............ *H04L 1/1867* (2013.01); *H04W 40/22* (2013.01); *H04L 1/1825* (2013.01); *H04L 1/20* (2013.01); *H04L 2001/0092* (2013.01)

(58) Field of Classification Search
None
See application file for complete search history.

(56) References Cited

U.S. PATENT DOCUMENTS

| | | | | |
|---|---|---|---|---|
| 6,400,281 B1 * | 6/2002 | Darby et al. | ........... | 340/933 |
| 7,330,457 B2 * | 2/2008 | Panwar et al. | ........... | 370/338 |
| 7,697,484 B2 * | 4/2010 | Kim et al. | ........... | 370/334 |
| 7,701,844 B2 * | 4/2010 | Terry | ........... | 370/216 |
| 8,213,409 B2 * | 7/2012 | Rudnick et al. | ........... | 370/351 |
| 2006/0193391 A1 * | 8/2006 | Borran et al. | ........... | 375/260 |
| 2006/0227743 A1 * | 10/2006 | Ishimori et al. | ........... | 370/331 |
| 2008/0155148 A1 | 6/2008 | Oyman | ........... | 710/106 |
| 2008/0212467 A1 * | 9/2008 | Hsieh et al. | ........... | 370/229 |
| 2009/0092073 A1 * | 4/2009 | Doppler et al. | ........... | 370/315 |
| 2013/0089020 A1 * | 4/2013 | Hakola et al. | ........... | 370/312 |

FOREIGN PATENT DOCUMENTS

WO    WO 2008/038895 A2    4/2008

* cited by examiner

*Primary Examiner* — Hassan Kizou
*Assistant Examiner* — Roberta A Shand
(74) *Attorney, Agent, or Firm* — Harrington & Smith

(57) ABSTRACT

A method, apparatus, and computer program for cooperative transmission are provided. A re-transmitter for a data packet determined as not having been received at a re-ceiver correctly is selected amongst the potential re-transmitters in a cooperative transmission mode. In more detail, the re-transmitter is selected amongst an original transmitter of the data packet and assisting transmitters configured to assist transmission of the original transmit-ter. The assisting transmitters receive the data packet in the original transmission, unless errors occur in the reception at a given assisting transmitter, and are candidates for the retransmission in case the original transmission results in erroneous reception at the receiver.

22 Claims, 4 Drawing Sheets

COOPERATIVE TRANSMISSION IN WIRELESS COMMUNICATION SYSTEM

FIELD

The invention relates to the field of wireless telecommunications and, particularly, to cooperative transmission in a wireless communication system.

BACKGROUND

Fading in a multipath channel causes significant degradation in the quality of communications over mobile radio channels. Transmission diversity is one of the best techniques to mitigate the effects of multipath fading as well as to improve overall system performance. In particular, spatial diversity relies on the principle of transmitting signals from spatially separated transmitters via independent fading paths. In single user communications, multiple transmit and/or reception antennas may be used. However, this may be impractical or undesirable in a mobile terminal due to the small size of the terminal. To over-come this limitation, there has been proposed a user cooperation strategy that enables single-antenna mobiles to share their antennas and generate virtual multiple-antenna transmitter that allows them to achieve transmit diversity.

User cooperation is based on the fact that, when the user transmits signals to a destination receiver, neighboring users can also receive the signals because of the broadcast nature of the wireless channel. These neighboring users can then relay the signals to the receiver. A given user sees the other users as its virtual antennas and can, thus, expect the receiver to decode the information more reliably with the help of retransmissions by the other users.

BRIEF DESCRIPTION

According to an aspect of the present invention, there is provided a method as specified in claim 1.

According to another aspect of the present invention, there is provided an apparatus as specified in claim 13.

According to another aspect of the present invention, there is provided an apparatus as specified in claim 24.

According to yet another aspect of the present invention, there is provided a computer program product embodied on a computer readable distribution medium as specified in claim 25.

Embodiments of the invention are defined in the dependent claims.

LIST OF DRAWINGS

Embodiments of the present invention are described below, by way of example only, with reference to the accompanying drawings, in which FIG. 1 illustrates a general concept of cooperative communications according to embodiments of the invention;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
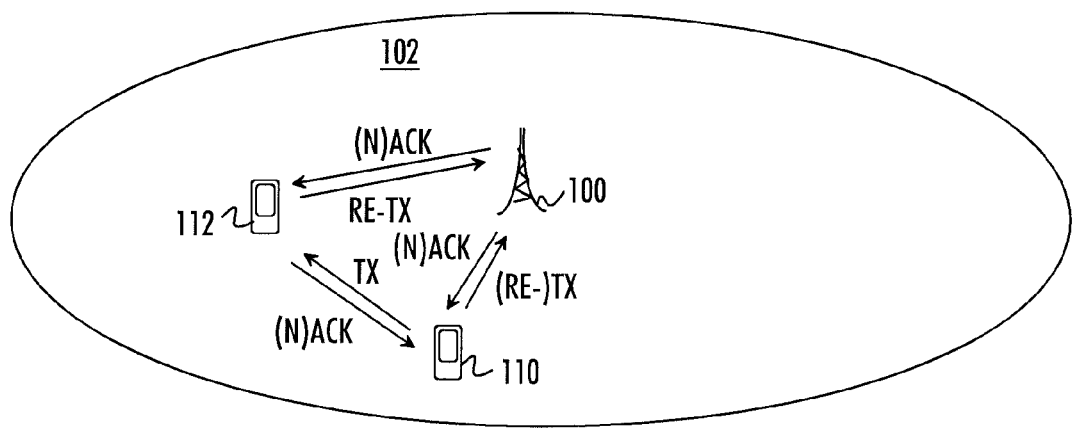

FIG. 1 illustrates a general concept of cooperative communications according to embodiments of the invention. A first and a second wireless communication device 110 and 112 are in a cooperative transmission mode and assist one another in the transmission of data packets to a base station 100 in a cell 102 associated with the base station 100. One of the devices 110, 112 is an original transmitter and the other is an assisting transmitter which assists in the transmission by providing retransmissions of data packets for the original transmitter according to a determined rule. In FIG. 1 the first wireless communication device 110 is designated as the original transmitter and the second wireless communication device 112 is designated as the assisting transmitter, but in practice both devices 110, 112 may function as both the original and assisting entity depending on the data packet being considered. In this case, the wireless communication devices are user terminals served by the base station according to any radio communication protocol known in the art, such as any second or third generation mobile communication system or an evolution version thereof, next generation mobile communication system, etc. Basically, the present invention is not dependent on the radio interface technology. The present invention is also applicable to all types of duplexing, e.g. time-division duplexing and frequency-division duplexing.

The pairing of the wireless communication devices 110, 112 for the cooperative transmission mode may be controlled by the base station, or at least part of the control may be distributed to the wireless communication devices 110, 112. The selection of which wireless communication devices 110, 112 should be paired for the cooperative transmission may be based on, for example, knowledge of the location devices 110, 112, channel allocation of the devices 110, 112 and/or channel quality between the devices. In more detail, the wireless communication devices 110, 112 located close to each other and transmitting on the same channel may be paired for the cooperative transmission. The close proximity of the devices 110, 112 may be determined on the basis of location monitoring performed in the cell and/or estimation of the channel quality between the devices 110, 112. The channel estimation may be based on the detection of a pilot signal transmitted by one device in the other device and measurement of the strength of the pilot signal. Other methods for performing the channel estimation are naturally possible.

Figure 2:
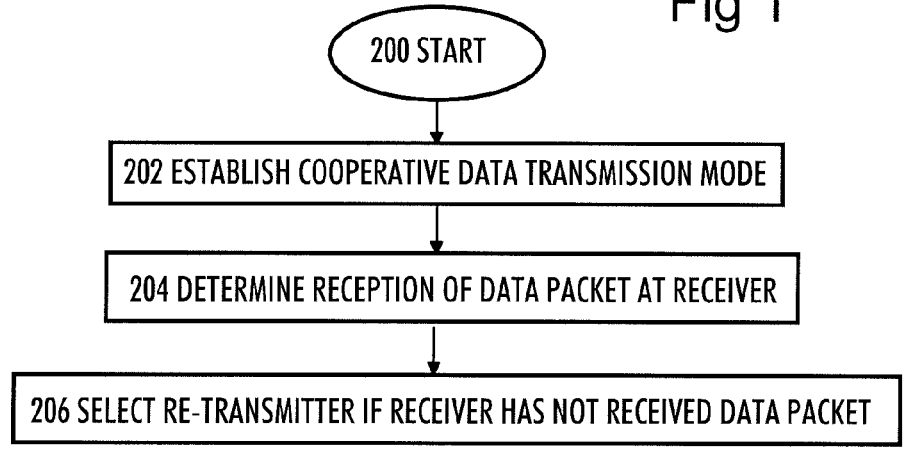
FIG. 2 is a generic flow diagram illustrating a process of performing communications according to embodiments of the invention.

FIG. 2 is a generic flow diagram illustrating a process of performing communications according to embodiments of the invention. The process may be implemented in either one of the wireless communication devices 110, 112. Referring to FIG. 2, the process starts in block 200. In block 202, the wireless communication device establishes the cooperative data transmission mode with another wireless communication device. This may be include communication with the base station, wherein the base station may acknowledge the establishment cooperative data transmission mode, provide the wireless communication device with an identifier and transmission resources allocated to the other communication device, with which the cooperative transmission is established. Now that the wireless communication device has knowledge of the identity and transmission resources of the cooperating device, the wireless communication device configures itself to activate reception at the transmission resources of the cooperating device so as to receive and detect a data packet of the cooperating device and carry out retransmission, if necessary and so determined. On the other hand, the wireless communication device also has knowledge of the cooperating device being a potential re-transmitter for the data packets transmitted by the wireless communication device itself.

With respect to blocks 204 and 206, let us consider two cases, wherein the wireless communication device is either an original transmitter of a data packet or an assisting transmitter assisting transmission of a data packet of the other wireless communication device. Let us first consider the case in which the wireless communication device is the original transmitter of the data packet. In block 204, the wireless communication device has already transmitted the data packet and now determines whether or not a receiver, to which the data packet is destined (the base station in this case), has received the data packet correctly. If it has, the process may end for that particular data packet, and a new data packet may be transmitted in the next transmission resource. If the receiver has not received the data packet, a re-transmitter of the data packet is selected in block 206. The selection is made between the original transmitter and the assisting device, if the assisting device has indicated that it has received and decoded the data packet correctly.

Let us next consider the case where the wireless communication device is the assisting device. In block 204, the wireless communication device has already performed data detection for the radio signal received in transmission resources of the original transmitter of the data packet. Otherwise, the procedure is similar to that above, i.e. the assisting device in block 204 determines whether or not the receiver has received the data packet correctly. The assisting device may monitor acknowledgment messages transmitted by the receiver to the original transmitter in order to execute the determination. Block 206 is similar to that described above. The communication about the selection of the re-transmitter may be realized with acknowledgment messages transmitted between the wireless communication devices, as will be described below in greater detail.

Figure 3:
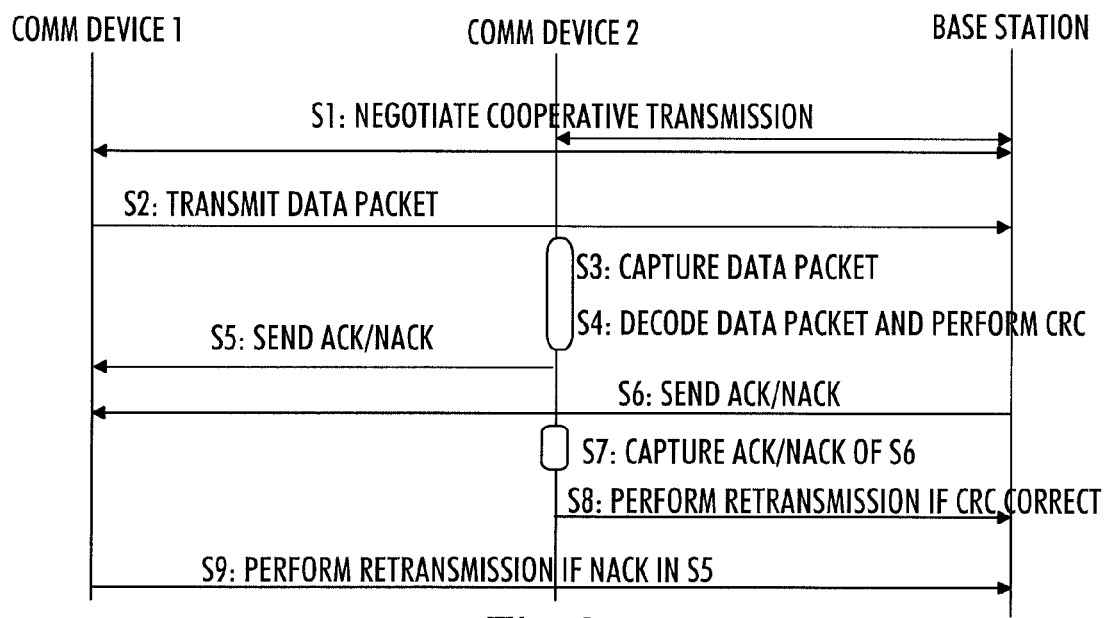
FIG. 3 is a signaling diagram illustrating cooperative communication according to an embodiment of the invention.

FIG. 3 is a signaling diagram illustrating cooperative communication according to an embodiment of the invention in greater detail. In S1, the wireless communication devices 1 and 2 negotiate the establishment of the cooperative transmission between the two devices 1 and 2. The communication may be carried out through the base station, and the base station may provide the devices with the identifier of the other device, with which the cooperative communication mode is established, and other necessary information. Then, each device 1, 2 transmits its own data packets in the transmission resources allocated to it and, additionally, each device 1, 2 performs reception on the transmission resources of the other device 2, 1 to carry out the possible retransmission.

Let us now consider a case where the first communication device 1 is the original transmitter of a data packet, and the second communication device 2 is the assisting device. In S2, the original transmitter transmits a data packet to the base station in transmission resources allocated to the original transmitter for uplink transmission. In S3, the assisting device listens to the transmission resources of the original transmitter and captures the data packet. The assisting device carries out data detection, decoding and cyclic redundancy check (CRC) of the captured data packet in order to determine whether or not it has received the data packet error-freely, i.e. without errors.

If the CRC indicates correct reception of the data packet, the assisting device sends a positive acknowledgment message (ACK) to the original transmitter in S5. ACK indicates correct reception of the data packet. On the other hand, if the CRC indicates that the decoded data packet contains errors, the assisting device sends a negative acknowledgment message (NACK) to the original transmitter in S5. NACK indicates erroneous reception of the data packet. The ACK/NACK message may be contained in a control part of a data packet transmitted by the assisting device to the base station in the next transmission resource of the assisting device, and the original transmitter may receive and detect the ACK/NACK message from the captured data packet. Alternatively, the assisting device may transmit a separate acknowledgment message. As an alternative to the transmission of NACK, the assisting device may omit transmission of the acknowledgment message. In such a case, the original transmitter may deduce that the data packet is not received at the assisting device upon expiry of a timer started at the transmission of the data packet.

In S6, the base station (the receiver of the data packet) transmits an acknowledgment message indicating whether or not the base station has received and decoded the data packet error-freely. The acknowledgment message is either ACK or NACK. Similarly, the base station may omit transmission of the acknowledgment message as an alternative to the transmission of NACK, and the original transmitter may deduce that the data packet is not received at the base station upon expiry of the timer before the reception of the acknowledgment message. The timers associated with NACKs of S5 and S6 may be the same or different timers, depending on the implementation.

In S7, the assisting device captures the ACK/NACK transmitted by the base station in S6. If the assisting device detects that the message captured in S7 is NACK and if the CRC in S4 indicates correct reception of the data packet, the assisting device performs a retransmission of the data packet in the next transmission resource allocated to the assisting device in S8. On the other hand, if the message in S6 is NACK and if the original transmitter received NACK also in S5 (or no acknowledgment at all), the original transmitter performs the retransmission in S9. Naturally, if the message received in S6 is ACK, no retransmission is necessary.

Accordingly, the acknowledgment message transmitted in S5 is used to control the selection of the re-transmitter. If the assisting device sends ACK, it indicates that the assisting device is the re-transmitter. On the other hand, if the assisting device sends NACK or no acknowledgment at all, the original transmitter selects itself as the re-transmitter. In summary, the assisting device is selected as the first re-transmitter, if the assisting device has decoded the data packet error-freely. If the retransmission also fails, the original transmitter may perform the retransmission automatically upon determining non-reception of the data packet in the receiver. In this manner the two devices may perform the retransmission alternately until the data packet is received in the receiver, i.e. until reception of ACK from the receiver.

Figure 4:
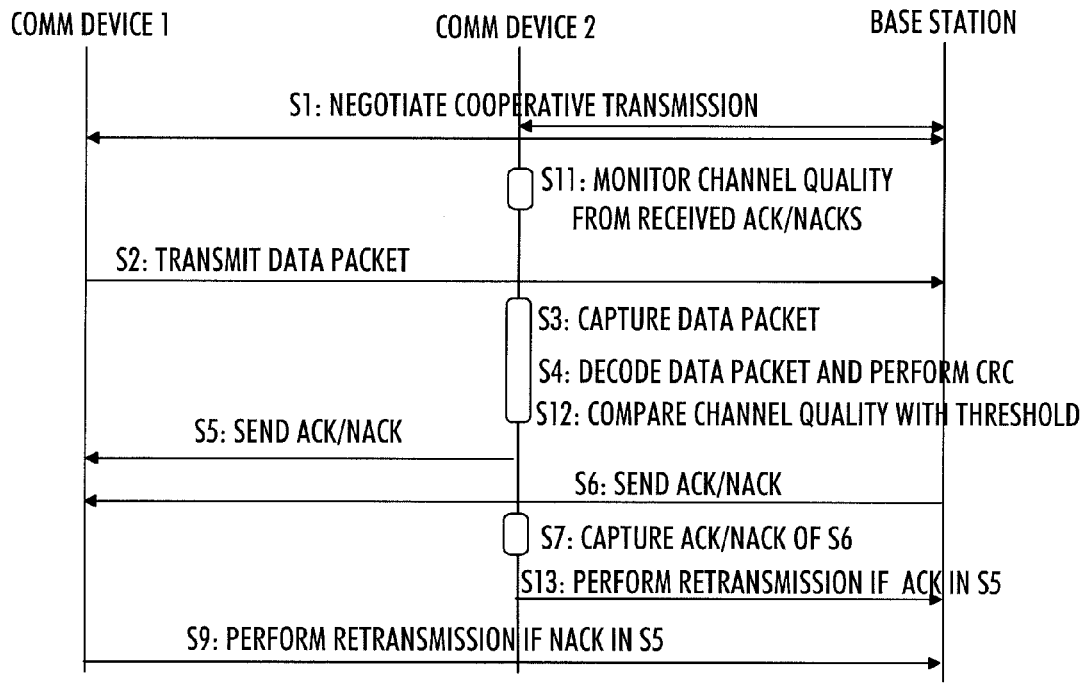
FIG. 4 is a signaling diagram illustrating cooperative communication according to another embodiment of the invention.

FIG. 4 illustrates an embodiment of the cooperative transmission, in which the channel quality between each wireless communication device 1, 2 and the base station is monitored and used when selecting the re-transmitter. In FIG. 4, steps with the same numbering as in FIG. 3 refer to the same operations. The cooperative transmission mode is negotiated in S1. In S11, the assisting device monitors the (uplink) channel quality between the assisting device (wireless communication device 2) and the base station. In the embodiments described, the channel quality is monitored on the basis of acknowledgment messages received from the base station with respect to data packets transmitted by the assisting device. The data packets may be data packets of the other wireless device 1 retransmitted by the assisting device or data packets, for which the wireless communication device 2 is the original transmitter.

The uplink channel quality could be estimated from a pilot signal received from the base station, but that would require reciprocity of the communication channel. The channel quality could also be determined from uplink channel quality indicators received from the base station, but that would increase signaling overhead, unless the uplink channel quality indicators are already used for another purpose. The channel quality determined from the received ACK/NACKs may be a long-term channel quality obtained by performing an averaging operation for multiple received ACK/NACKs. In this case, the channel quality averages to an area between excellent (all ACKs) and unusable (all NACKs). In practice, the averaging may be carried out by counting the number of received ACKs and/or NACKs within a determined period of time, wherein reception of no acknowledgment message with respect to a given data packet is deemed as NACK. Then, the channel quality may be approximated on the basis of the number of ACKs and/or NACKs received within the determined period of time by comparing the number of received ACK/NACKs with the total number of received acknowledgment messages.

Alternatively, the channel quality may be monitored by assigning a first value to ACK and a second value to NACK and averaging the first and second values over a predetermined time period (an averaging period) or number of received acknowledgment messages. Actually, the channel quality determined in both embodiments from the received ACK/NACKs is a packet loss ratio or packet error rate but it has a high correlation with other channel quality indicators, such as signal-to-noise ratio (SNR) or signal-to-interference-plus-noise ratio (SINR).

Alternatively, the channel quality may be determined from one received ACK/NACK, e.g. the most recently received ACK/NACK, in which case the channel quality is determined as either excellent (ACK) or unusable (NACK). This embodiment performs no averaging. In this embodiment, reception of no acknowledgment message for a given data packet is also determined as equivalent to NACK.

Steps S2 to S4 in FIG. 4 are similar to those in FIG. 3. In S12, the assisting device compares the determined channel quality with a predetermined threshold level. The threshold level may be stored in the device beforehand. If the current channel quality is determined to be better than the threshold level in S12 and if the CRC performed in S4 indicates correct reception of the data packet, the assisting device sends ACK in S5. However, if the current channel quality is determined to be worse than the threshold level in S12 and if the CRC performed in S4 indicates erroneous reception of the data packet, the assisting device sends NACK in S5 (or does not send any acknowledgment). S6 and S7 are again similar to those of FIG. 3. S13 is similar to S8 in the sense that if the assisting device has sent ACK in S5, it performs the retransmission of the data packet in S13, if the base station is determined as not having received the data packet. In this embodiment, the selection of the re-transmitter, i.e. the retransmission is based on the channel quality in addition to the capability of the assisting device to decode the received data packet.

Figure 5:
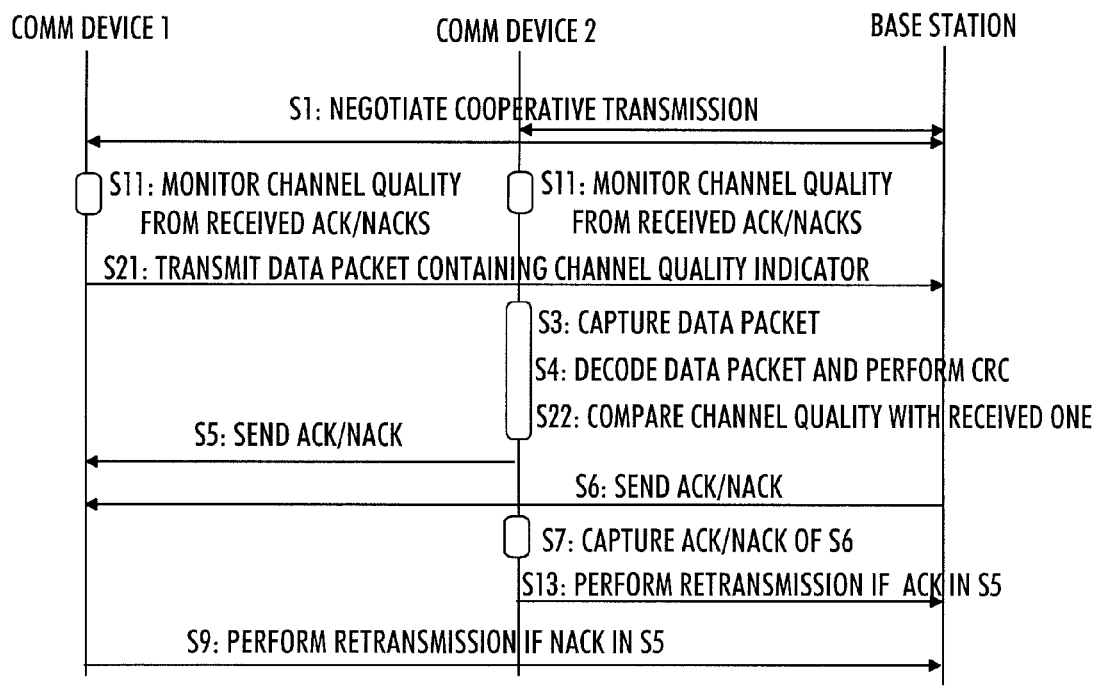
FIG. 5 is a signaling diagram illustrating cooperative communication according to yet another embodiment of the invention.

FIG. 5 illustrates cooperative communication according to yet another embodiment of the invention. This embodiment may be called opportunistic retransmission, and the process is similar to that of FIG. 4 except that both devices 1, 2 monitor the channel quality, and the original transmitter provides the assisting device with the channel quality information of the original transmitter. Again, the steps with the same numeral as in previous figures refer to similar operations. In this embodiment, S11 is performed in both the original transmitter and the assisting device. The monitoring of the channel quality may be carried out on the basis of ACK/NACKs received from the base station, and the channel quality monitored may be an average or instantaneous channel quality. Actually, the channel quality monitoring is carried out in both devices also in the embodiment of FIG. 4, if both devices 1, 2 assist each other in the cooperative transmission.

In S21, the original transmitter transmits a data packet to the base station. The data packet may include a field carrying the channel quality indicator indicating the channel quality between the original transmitter and the base station. In case the monitored channel quality is an instantaneous channel quality, the field may be a one-bit field indicating whether the channel is excellent or unusable. If averaging is used, the resolution of the channel quality is higher, and a longer field is needed depending on the resolution of the averaged channel quality, e.g. the averaging period. When the assisting device in S3 and S4 captures and decodes the data packet, it obtains the channel quality indicator. In S22, the assisting device sets the channel quality received from the original transmitter as the threshold level and compares the channel quality between the assisting device and the base station with the threshold level, that is with the channel quality between the original transmitter and the base station. If the current channel quality of the assisting device is determined to be better than the channel quality of the original transmitter in S22 and if the CRC performed in S4 indicates correct reception of the data packet, the assisting device sends ACK in S5. However, if the current channel quality of the assisting device is determined to be worse than the channel quality of the original transmitter in S22 and if the CRC performed in S4 indicates erroneous reception of the data packet, the assisting device sends NACK in S5 (or does not send any acknowledgment). S6, S7, and S13 are similar to those of FIG. 4.

When using instantaneous channel qualities based on the most recent ACK/NACK, and occasionally also with the averaged channel qualities, it is probable that the channel qualities of both the original transmitter and the assisting device are equal. In such a case, there may be a preset priority between the original transmitter and the assisting device for retransmission. Either the original transmitter or the assisting device may have a higher priority to be the re-transmitter in such a case. If the channel qualities equal to each other in S22, the assisting device may check the prioritization for the retransmission from a memory. If the assisting device has the priority and if the CRC in S4 indicates correct reception of the data packet, the assisting device sends ACK in S5. Otherwise, the assisting device sends NACK in S5.

Figure 6:
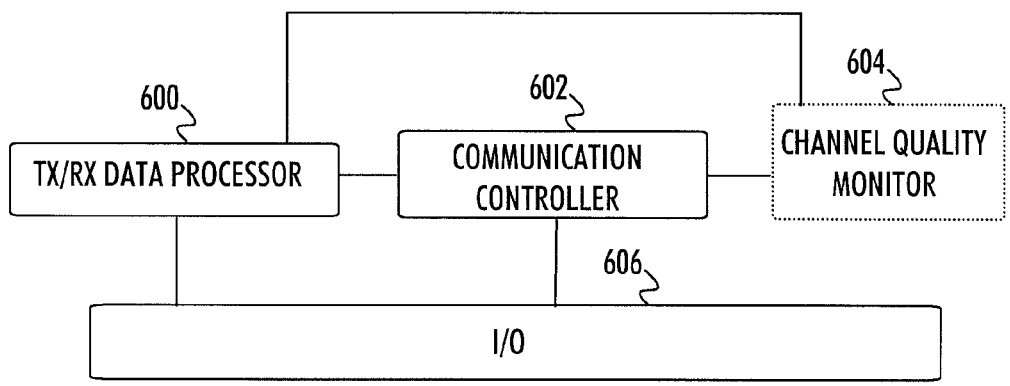
FIG. 6 illustrates functional elements of an apparatus according to an embodiment of the invention.

FIG. 6 illustrates functional elements of an apparatus according to an embodiment of the invention. The apparatus is applicable to the wireless communication device described above and capable of controlling cooperative communications, as described above. The apparatus may be implemented by one or more processing units realized by one or more digital signal processors, micro controllers and/or application-specific integrated circuits.

The apparatus may comprise at least an interface 606 to enable a communication connection with other elements of the wireless communication device and with other radio transceivers. The apparatus further comprises a communication controller 602 controlling the cooperative communications of the wireless communication device. The communication controller 602 is configured to establish the cooperative data transmission mode, to determine whether or not a data packet transmitted by a given wireless communication device in the cooperative transmission is received at the receiver, and to select a re-transmitter for the data packet, when the receiver is determined as not having received the data packet.

The apparatus may further comprise a data packet processor 600 configured to process data packets to be transmitted and received data packets. The data packet processor may construct the format of the data packet to be transmitted according to a communication protocol used in the communication and perform encoding, modulation, and other signal processing operations. Then, the data packet processor 600 may send the data packet to transmission parts of the wireless communication device through the interface 606. Similarly, the data packet processor 600 receives data packets through the interface 606, performs data detection, decoding and CRC operations for the received data packet, and extracts the necessary information from the data packet. If the received data packet transmitted by the other wireless device in a cooperative transmission mode with the device including the apparatus of FIG. 6, the data packet processor performs the CRC for the received data and extracts channel quality information from the data packet, if the wireless communication devices operate according to the embodiment of FIG. 5. The data packet processor informs the communication controller 602 of the result of the CRC and outputs the channel quality value to a channel quality monitor 604. If the CRC indicates errors, the data packet processor 600 may discard the data packet. Otherwise, the data packet processor 600 stores the data packet for retransmission.

Similarly, the data packet processor 600 detects acknowledgment messages received from the base station or the other wireless communication device and outputs the ACK/NACKs to the communication controller 602 and to the channel quality monitor 604. Moreover, the data packet processor 600 performs the retransmissions under the control of the communication controller 602.

The channel quality monitor 604 monitors the channel quality on the basis of the ACK/NACKs received from the data packet processor 600. The channel quality monitor 604 may monitor the average channel quality or the instantaneous channel quality. Additionally, the channel quality monitor 604 may carry out comparison of the channel qualities referred to in S12 and S22 upon request from the communication controller 602 and output the result of the comparison to the communication controller 602. The channel quality monitor is an optional element, because the cooperative transmission may be carried out according to the procedure described above with reference to FIG. 3.

As mentioned above, the communication controller 602 controls the communication of the wireless communication device. First of all, the communication controller 602 controls the data packet processor 600 to process data packets related to a communication connection with the base station. Additionally, the communication controller 602 monitors transmission resources of the other wireless communication device, with which the cooperative transmission is conducted, and controls the data packet processor to detect and decode data in transmission resources allocated to the other wireless communication device. The communication controller 602 makes the selection of the re-transmitter for the data packets captured from the transmission resource of the other wireless communication device on the basis of CRC information received from the data packet processor 600 and the result of the channel quality comparison (if it is used in the selection) received from the channel quality monitor 604. The communication controller 602 may request the channel quality monitor 604 to make the comparison upon reception of positive CRC information for a captured data packet from the data packet processor 600. If the communication controller 602 selects the assisting device to make the retransmission, wherein the communication controller is included in the assisting device for that data packet, it controls the data packet processor 600 to transmit ACK to the original transmitter and to execute the retransmission in the next suitable transmission resource of the assisting device. If the communication controller 602 selects the original transmitter as the re-transmitter, the communication controller 602 controls the data packet processor 600 to transmit NACK to the original transmitter or takes no action. In the latter case, the original transmitter deduces NACK upon expiry of the timer.

With respect to data packets for which the communication controller 602 is part of the original transmitter, the communication controller deduces the re-transmitter on the basis of an acknowledgment message received from the partner of the cooperative transmission. If the communication controller 602 receives ACK for a given data packet through the data packet processor 600, the communication controller 602 deduces that the partner is the re-transmitter. Otherwise, the communication controller 602 carries out the retransmission.

Figure 7:
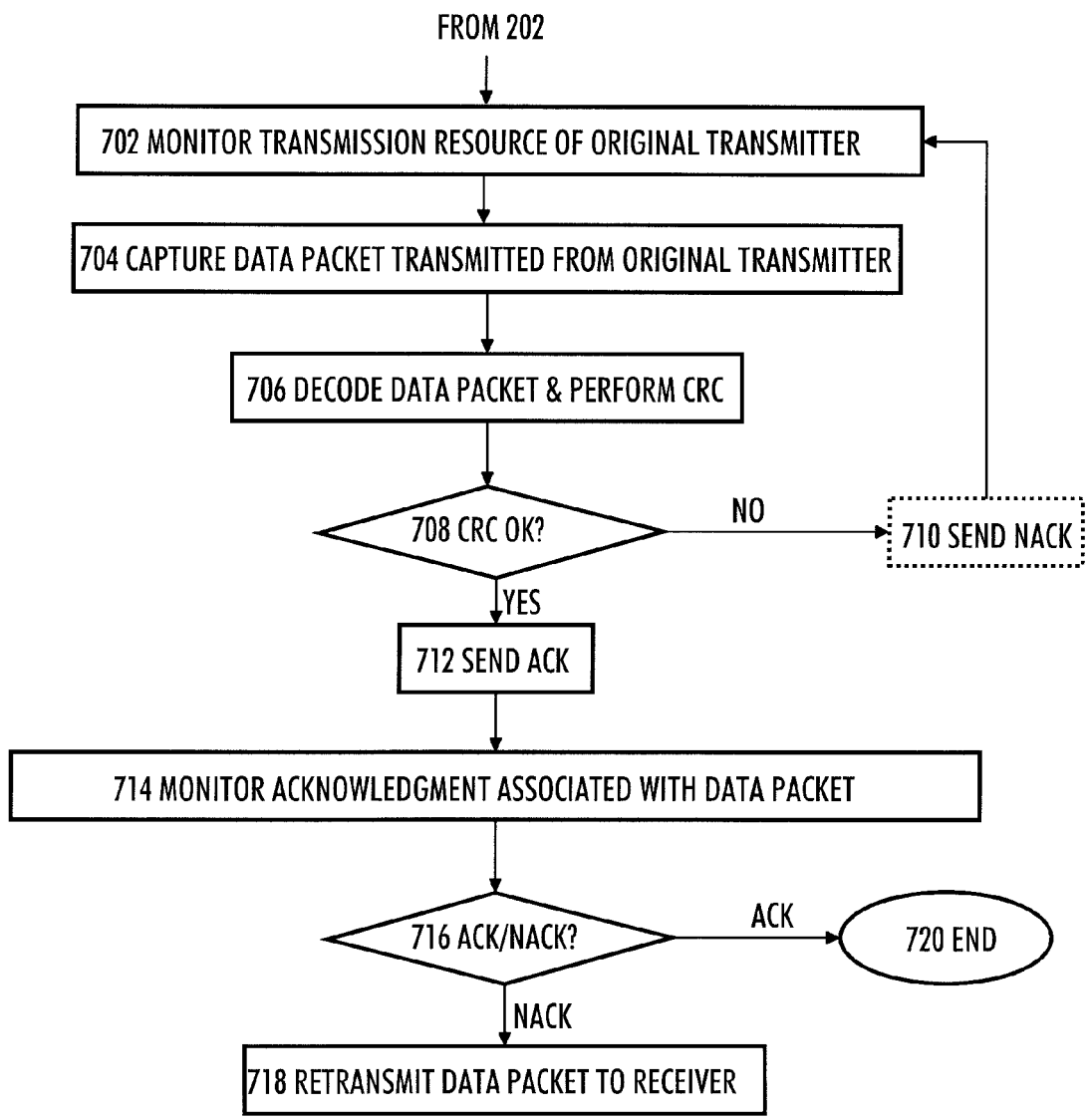
FIG. 7 is a flow diagram illustrating a process for assisting transmission of a data packet in a wireless communication device according to an embodiment of the invention.

FIG. 7 is a flow diagram illustrating a process for assisting transmission of a data packet in a wireless communication device according to an embodiment of the invention. The process may be carried out in the apparatus of FIG. 6 for data packets for which the apparatus is part of the assisting transmitter. The process relates to the embodiment described above with reference to FIG. 3, wherein the re-transmitter is selected alternately between the assisting transmitter and the original transmitter.

The process is also a more detailed description of the process of FIG. 2 and, particularly, a more detailed description of steps 204 and 206. After block 202, the process proceeds to block 702 where the assisting transmitter monitors the transmission resource of the original transmitter. The transmission resource may be monitored by first monitoring a downlink control channel of the original transmitter to detect the transmission resources of the original transmitter and then activating reception at the detected transmission resources of the original transmitter. The transmission resources may comprise one or more of the following: frequency channel, transmission time interval, and spreading code.

In block 704, the assisting transmitter captures a data packet from the transmission resources monitored in block 702, and the captured data packet is decoded in 706. Additionally, the CRC is made to check whether or not the data packet was decoded error-freely. If the CRC indicates correct reception of the data packet in block 708, the process moves to block 712 where the assisting transmitter sends ACK to the original transmitter. However, if the CRC indicates erroneous reception of the data packet in block 708, the process moves to block 710 where the assisting transmitter sends NACK to the original transmitter. Block 710 may be omitted, if the assisting transmitter transmits nothing instead of transmitting NACK. From block 710, the process returns to block 702.

The process moves from block 712 to block 714 where the assisting transmitter monitors for an acknowledgment message transmitted by a destined receiver of the data packet captured in block 704 (the base station). If the assisting transmitter detects in block 716 that the base station has transmitted ACK with respect to the data packet, the process moves to block 720 where the process ends for that data packet. If NACK is detected or no acknowledgment is detected until expiry of the timer in block 716, the process moves to block 718 where the assisting transmitter transmits the data packet captured in block 704 to the base station in a transmission resource allocated to the assisting transmitter. Thereafter, the process may continue by monitoring the acknowledgment for the retransmission of the data packet.

In case the CRC indicates erroneous reception of the data packet in block 708 and the process moves to block 710 (or 702), the original transmitter performs the retransmission, because the assisting transmitter has not decoded the data packet correctly. The assisting transmitter may in a subsequent round capture the retransmission of the same data packet and perform the decoding and CRC for the retransmitted data packet. If the data packet is now decoded correctly, the process may then move from block 708 to 712.

Figure 8:
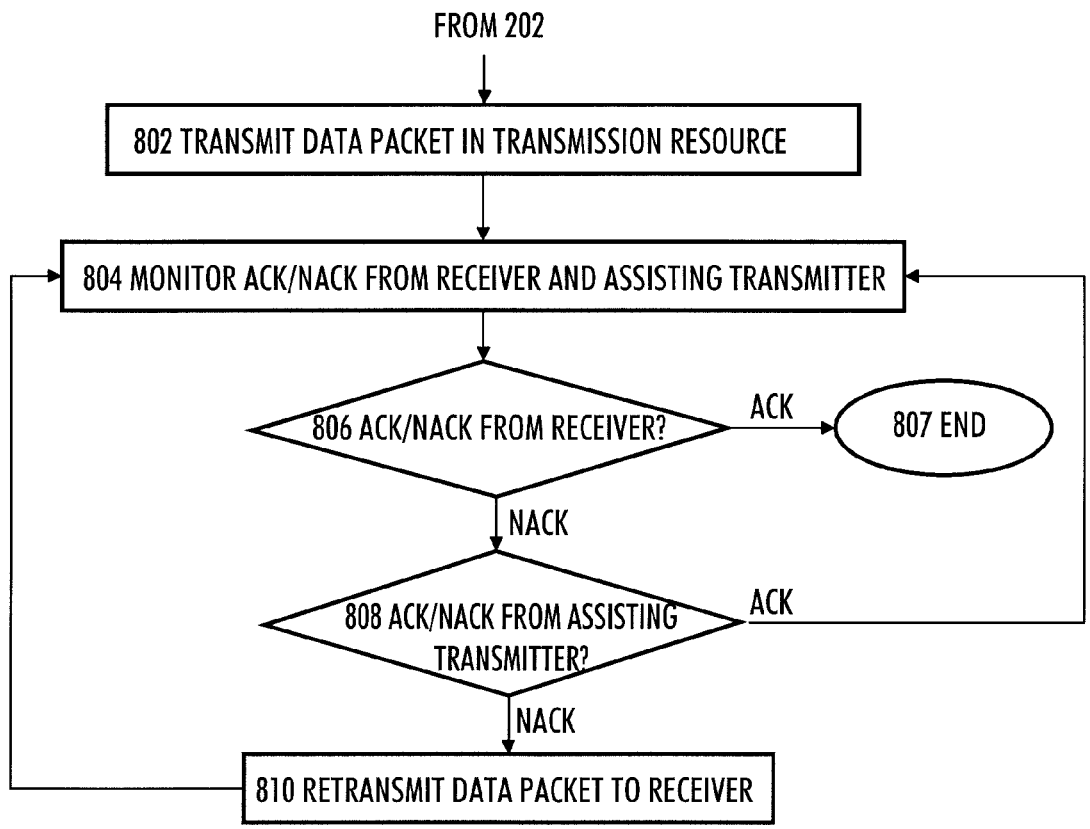
FIG. 8 is a flow diagram illustrating a process of transmitting a data packet in a cooperative transmission mode according to an embodiment of the invention.

FIG. 8 is a flow diagram illustrating a process of transmitting a data packet in a cooperative transmission mode according to an embodiment of the invention. The process may be carried out in the apparatus of FIG. 6 for data packets for which the apparatus is part of the original transmitter. The process relates to any embodiment described above with reference to FIGS. 3 to 5. From block 202, the process moves to block 802 where the original transmitter transmits a data packet destined to a receiver (the base station) in a transmission resource allocated to the transmitter. In block 804, the original transmitter of the data packet monitors for an acknowledgment message for the data packet from both the receiver and the assisting transmitter with which the cooperative transmission is conducted.

In block 806, it is determined whether the receiver has transmitted ACK or NACK. If the receiver is determined to have transmitted ACK, the process moves to block 807 where the process ends for that data packet. If the receiver is determined to have transmitted NACK, the process moves to block 808 for selection of the re-transmitter on the basis of whether the assisting transmitter has transmitted ACK or NACK. If it is determined in block 808 that the assisting transmitter has transmitted ACK, the assisting transmitter is selected as the re-transmitter and the process returns to block 804 to monitor for ACK/NACK from the receiver. If the receiver still does not receive the data packet correctly, the process may be continued by the original transmitter being the second re-transmitter and so on.

However, if it is determined in block 808 that the assisting transmitter has transmitted NACK, the original transmitter is selected as the re-transmitter and the process moves to block 810 where the original transmitter retransmits the data packet and, thereafter, returns to block 804 to monitor ACK/NACK from the receiver and from the assisting transmitter.

The processes of FIGS. 7 and 8 may be executed in parallel as independent processes in the wireless communication device or they may be intertwined. For example, the process may move from block 806 to block 702 and from block 716 to block 802. The whole automatic repeat request (ARQ) process for a given data packet is often not finished before starting the next ARQ process for the next data packet. This applies particularly in the cooperative transmission, where a given wireless communication device manages ARQ processes related to data packets of its own and data packets of another wireless communication device. Therefore, the order of execution of blocks in processes of FIGS. 7 and 8 is case-dependent.

Figure 9:
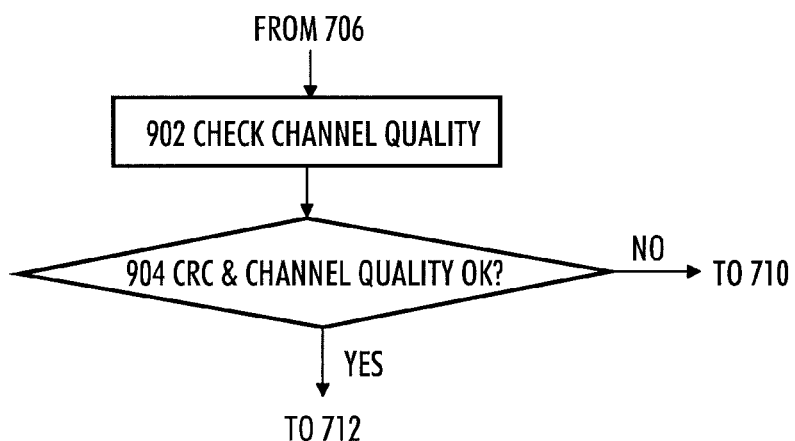
FIG. 9 illustrates a process which is a modification of the process illustrated in FIG. 7.

FIG. 9 illustrates a process which is a modification of the process illustrated in FIG. 7. The process of FIG. 9 utilizes the channel quality in the selection of the re-transmitter for the data packet. The process moves from block 706 to block 902 where the assisting transmitter checks the channel quality between the assisting transmitter and the base station. In block 904 it is determined whether or not the CRC indicates correct reception of the data packet and the channel quality is above the predetermined threshold level. If the CRC indicates correct reception of the data packet and if the channel quality indicates better channel quality than the threshold level, the process moves to block 712. Otherwise, the process moves to block 710.

The process of FIG. 9 sets quite a strict rule in the sense that CRC must be successful and the channel quality has to be better than the threshold level in order to select the assisting transmitter as the re-transmitter. Particularly in the embodiment where channel qualities of both the original transmitter and the assisting transmitter are compared in block 904, a looser rule may be applied. For example, the assisting transmitter may be selected as the re-transmitter, if the channel quality of the assisting transmitter is higher than the threshold regardless of the result of the CRC. This embodiment prioritizes the better channel quality over that the assisting transmitter may transmit erroneous data and, thus, relies on that the erroneous data can be corrected in higher level error correction processes. In other words, emphasis is put on the reliability of transmitting the data packet over the radio channel to the base station. In this embodiment, an offset may be applied to the channel quality comparison, i.e. the channel quality of the assisting transmitter must be better than the channel quality of the original transmitter plus the offset.

The processes or methods described in FIGS. 2 and 7 to 8 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems having a fixed infrastructure, but it is also applicable to other suitable telecommunication systems. An example of another telecommunication system, in which the embodiments of the invention may be implemented, is an ad hoc network established between a number of mobile communication devices. In such a scenario, the base station described above in connection with the embodiments may be replaced by a mobile communication device. In this case, the mobile communication devices may negotiate the cooperative transmission and related parameters directly among each other, and routing of the communication through the base station may be omitted. Naturally, one of the mobile communication devices may function as a master and control the communications in a similar manner as the base station. In any case, the implementation of the invention in such a communication system without the fixed infrastructure is quite straightforward.

Furthermore, the embodiments described above are described in the context that the wireless communication devices in the cooperative transmission mode form a group of two devices. The group may, however, comprise more than two devices. In such a case, the selection and indication of the re-transmitter may need additional logic, if only one of the devices is to be selected as the re-transmitter. The original transmitter may monitor acknowledgment messages received from the assisting transmitters and, if one of the acknowledgment messages is ACK, the original transmitter determines that one of the assisting transmitters makes the retransmission. Otherwise, the original transmitter makes the retransmission. The assisting transmitters may also monitor acknowledgment messages transmitted by the other assisting transmitters, and the assisting transmitter that transmits ACK first is selected as the re-transmitter. Other rules of selection are naturally possible.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
establishing a cooperative data transmission mode, wherein at least one wireless communication device is an assisting transmitter and a potential re-transmitter for another wireless communication device being an original transmitter of a data packet destined to a receiver in an original transmission, wherein the establishing comprises the original transmitter:
contacting the receiver to obtain an identifier for the assisting transmitter to allow the original transmitter to transmit to the assisting transmitter,
transmitting its own data packets to the assisting transmitter, and
receiving an acknowledgment message or no acknowledgment message from the assisting transmitter,
wherein receiving a positive acknowledgment message from the assisting transmitter means that the assisting transmitter is determined to have received the data packets, and
wherein receiving a negative acknowledgment message or no acknowledgment message from the assisting transmitter means that the assisting transmitter is determined to not have received the data packets;
determining whether or not a data packet transmitted by the original transmitter in the original transmission is received at the receiver, wherein the determining comprises the original transmitter:
transmitting its own data packets to the receiver,
receiving an acknowledgment message or no acknowledgment message from the receiver,
wherein receiving a positive acknowledgement message from the receiver means that the receiver is determined to have received the data packets, and
wherein receiving a negative acknowledgment message or no acknowledgment message from the receiver means that the receiver is determined to not have received the data packets; and
selecting, when the receiver is determined as not having received the data packet, a re-transmitter among the original transmitter and the assisting transmitter which received the data packet from the original transmitter coincident with the original transmission to the receiver and decoded the data packet, wherein the selecting comprises the original transmitter:
in response to a positive acknowledgement message from the receiver, not retransmitting,
in response to a negative acknowledgment message or no acknowledgment message from the receiver and a positive acknowledgement message from the assisting transmitter, indicating to the assisting transmitter to retransmit, and
in response to a negative acknowledgment message or no acknowledgment message from the receiver and a negative acknowledgment message or no acknowledgment message from the assisting transmitter, retransmitting by the original transmitter itself.

2. The method of claim 1, wherein the receiver is determined to have received the data packet upon reception of a positive acknowledgment message from the receiver, and wherein the receiver is determined to not have received the data packet upon reception of a negative acknowledgment message received from the receiver or upon reception of no acknowledgment message from the receiver.

3. The method of claim 1, further comprising: controlling the selection of the re-transmitter with acknowledgment messages exchanged between the wireless communication devices in the cooperative data transmission mode.

4. The method according to claim 1, wherein the selection further comprises:
selecting as the re-transmitter an assisting transmitter which has decoded the data packet error-freely; or
selecting the original transmitter as the re-transmitter, if no assisting transmitter has decoded the data packet error-freely.

5. The method according to claim 1, further comprising:
receiving, from the receiver in the assisting transmitter, a plurality of acknowledgment messages related to data packets transmitted by the assisting transmitter;
monitoring the quality of a communication channel between the assisting transmitter and the receiver on the basis of the received acknowledgment messages; and
selecting the re-transmitter on the basis of the monitored channel quality.

6. The method of claim 5, wherein the monitoring comprises:
counting the number of received positive acknowledgment messages or received negative acknowledgment messages or both received positive acknowledgment messages and received negative acknowledgment messages within a determined period of time, wherein reception of no acknowledgment message with respect to a given data packet is deemed as a negative acknowledgment message; and
approximating the channel quality on the basis of the number of positive or negative or both positive and negative acknowledgment messages received within the determined period of time.

7. The method of claim 5, wherein the monitoring comprises: determining the instantaneous quality of the communication channel on the basis of the latest determined acknowledgment for a data packet transmitted from the assisting transmitter.

8. The method according to claim 5, wherein the selection of the re-transmitter further comprises:
- comparing the quality of the communication channel with a predetermined threshold level; and
- selecting the assisting transmitter as the re-transmitter for the data packet, if the comparison indicates that the quality of the communication channel is better than the predetermined threshold level.

9. The method according to claim 5, further comprising:
- receiving a data packet destined to the receiver at the assisting transmitter;
- decoding the received data packet and checking if the data packet comprises errors after the decoding;
- if the data packet is decoded error-freely and if the quality of the communication channel is better than the predetermined threshold level, transmitting a positive acknowledgment indicating the error-free reception of the data packet to the original transmitter as an indication that the assisting transmitter is the re-transmitter for the data packet.

10. The method of claim 1, wherein only one wireless communication device is selected as the re-transmitter.

11. A computer program product embodied on a non-transitory distribution medium readable by a computer and comprising program instructions which, when loaded into an apparatus, execute the method according to claim 1.

12. An apparatus, comprising:
- an interface to enable a communication connection; and
- a controller configured
  - to establish a cooperative data transmission mode, wherein at least one wireless communication device is an assisting transmitter and a potential re-transmitter for an original transmission from another wireless communication device being an original transmitter of a data packet destined to a receiver,
  - to determine whether or not a data packet transmitted by the original transmitter is received at the receiver, and
  - to select, when the receiver is determined as not having received the data packet, a re-transmitter among the original transmitter and the at least one assisting transmitter which received the original transmission and decoded the data packet from the original transmitter in the original transmission,
- wherein to establish a cooperative data transmission mode comprises:
  - the controller negotiating among the original transmitter, the assisting transmitter, and the receiver, obtaining an identifier from the receiver for the assisting transmitter to allow the original transmitter to transmit to the assisting transmitter, and
  - the controller controlling the original transmitter to transmit its own data packets to the assisting transmitter, and the assisting transmitter sending an acknowledgment message to the original transmitter,
    - wherein sending a positive acknowledgement message to the original transmitter means that the assisting transmitter is determined to have received the data packets, and
    - wherein sending a negative acknowledgment message to the original transmitter means that the assisting transmitter is determined to not have received the data packets; to receive an acknowledgment message or no acknowledgment message from the assisting transmitter,
- wherein to determine reception comprises:
  - the controller directing the original transmitter or the assisting transmitter to transmit data packets to the receiver,
  - the controller receiving an acknowledgment message or no acknowledgment message from the receiver,
    - wherein receiving a positive acknowledgement message from the receiver means that the receiver is determined to have received the data packets, and
    - wherein receiving a negative acknowledgment message or no acknowledgment message from the receiver means that the receiver is determined to not have received the data packets; and
- wherein to select retransmission comprises:
  - the controller, in response to a negative acknowledgment message or no acknowledgment message from the receiver and a positive acknowledgement message from the assisting transmitter, indicating to the assisting transmitter to retransmit, and
  - the controller, in response to a negative acknowledgment message or no acknowledgment message from the receiver and a negative acknowledgment message or no acknowledgment message from the assisting transmitter, indicating to the original transmitter to retransmit.

13. The apparatus of claim 12, wherein the receiver is determined to have received the data packet upon reception of a positive acknowledgment message from the receiver, and wherein the receiver is determined to not have received the data packet upon reception of a negative acknowledgment message received from the receiver or upon reception of no acknowledgment message from the receiver.

14. The apparatus of claim 12, wherein the controller is further configured to control the selection of the re-transmitter with acknowledgment messages exchanged between the wireless communication devices in the cooperative data transmission mode.

15. The apparatus according to claim 12, wherein the controller is further configured to select as the re-transmitter an assisting transmitter which has decoded the data packet error-freely, or to select the original transmitter as the re-transmitter, if no assisting transmitter has decoded the data packet error-freely.

16. The apparatus according to claim 12, wherein the controller is applicable to the assisting transmitter and further configured to receive, from the receiver through the interface, a plurality of acknowledgment messages related to data packets transmitted by the assisting transmitter, to monitor the quality of a communication channel between the assisting transmitter and the receiver on the basis of the received acknowledgment messages, and to select the re-transmitter on the basis of the monitored channel quality.

17. The apparatus of claim 16, wherein the controller is further configured to count the number of received positive acknowledgment messages or received negative acknowledgment messages or both received positive acknowledgment messages and received negative acknowledgment messages within a determined period of time, wherein reception of no acknowledgment message with respect to a given data packet is deemed as a negative acknowledgment message, and to approximate the channel quality on the basis of the number of positive or negative or both positive and negative acknowledgment messages received within the determined period of time.

18. The apparatus of claim 16, wherein the controller is further configured to determine an instantaneous quality of the communication channel on the basis of the latest determined acknowledgment for a data packet transmitted from the assisting transmitter.

19. The apparatus according to claim 16, wherein the controller is further configured to compare the quality of the communication channel with a predetermined threshold level, and to select the assisting transmitter as the re-transmitter for the data packet, if the comparison indicates that the quality of the communication channel is better than the predetermined threshold level.

20. The apparatus according to claim 16, wherein the controller is further configured to receive a data packet destined to the re-ceiver at the assisting transmitter, to decode the received data packet, to check whether or not the data packet comprises errors after the decoding, and if the data packet is decoded error-freely and if the quality of the communication channel is better than the predetermined threshold level, to send a positive acknowledgment indicating the error-free reception of the data packet to the original transmitter as an indication that the assisting transmitter is the re-transmitter for the data packet.

21. A method comprising
    establishing a cooperative data transmission mode, wherein at least one wireless communication device is an assisting transmitter and a potential re-transmitter for another wireless communication device being an original transmitter of a data packet destined to a receiver in an original transmission, wherein the establishing comprises the assisting transmitter
        receiving data packets from the original transmitter, and
        sending an acknowledgment message to the original transmitter,
            wherein sending a positive acknowledgement message to the original transmitter means that the assisting transmitter is determined to have received the data packets, and
            wherein sending a negative acknowledgment message to the original transmitter means that the assisting transmitter is determined to not have received the data packets;
    determining whether or not a data packet transmitted by the original transmitter in the original transmission is received at the receiver, wherein the determining comprises the assisting transmitter
        transmitting its own data packets to the receiver,
        receiving an acknowledgment message or no acknowledgment message from the receiver,
            wherein receiving a positive acknowledgement message from the receiver means that the receiver is determined to have received the data packets, and
            wherein receiving a negative acknowledgment message or no acknowledgment message from the receiver means that the receiver is determined to not have received the data packets; and
    selecting, when the receiver is determined as not having received the data packet, a re-transmitter among the original transmitter and the assisting transmitter which received the data packet from the original transmitter coincident with the original transmission to the receiver and decoded the data packet, wherein the selecting retransmission comprises the assisting transmitter
        in response to a negative acknowledgement message to the original transmitter, not retransmitting,
        in response to a positive acknowledgement message to the original transmitter and a negative acknowledgment message or no acknowledgment message from the receiver, not retransmitting, and
        in response to a positive acknowledgement message to the original transmitter and a positive acknowledgment message from the receiver, retransmitting.

22. A computer program product embodied on a non-transitory distribution medium readable by a computer and comprising program instructions which, when loaded into an apparatus, execute the method according to claim 21.

\* \* \* \* \*

UNITED STATES PATENT AND TRADEMARK OFFICE
CERTIFICATE OF CORRECTION

PATENT NO. : 9,112,695 B2
APPLICATION NO. : 13/120183
DATED : August 18, 2015
INVENTOR(S) : Juntti et al.

Page 1 of 1

It is certified that error appears in the above-identified patent and that said Letters Patent is hereby corrected as shown below:

In the claims

Claim 21, col. 16, line 23 "retransmission" should be deleted.

Signed and Sealed this
Eighth Day of December, 2015

Michelle K. Lee
*Director of the United States Patent and Trademark Office*